United States Patent
Evanoff et al.

(10) Patent No.: US 6,817,562 B2
(45) Date of Patent: Nov. 16, 2004

(54) TAPE DRIVE SYSTEM WITH RADIAL ALIGNMENT FEATURE

(75) Inventors: James J. Evanoff, Roseville, MN (US); Allan R. Markert, Lake Elmo, MN (US); Robert W. Tapani, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 73 days.

(21) Appl. No.: 10/292,039

(22) Filed: Nov. 12, 2002

(65) Prior Publication Data

US 2004/0089755 A1 May 13, 2004

(51) Int. Cl.⁷ .............................................. G11B 23/04
(52) U.S. Cl. ...................... 242/340; 242/342; 242/348; 242/611; 242/611.1
(58) Field of Search ................................ 242/340, 342, 242/348, 611.1, 611

(56) References Cited

U.S. PATENT DOCUMENTS

| | | | | |
|---|---|---|---|---|
| 5,752,669 A | * | 5/1998 | Yeakley | 242/340 |
| 5,992,782 A | * | 11/1999 | Goodknight | 242/340 |
| 6,164,579 A | * | 12/2000 | Todd | 242/342 |
| 6,273,352 B1 | | 8/2001 | Johnson et al. | |
| 6,452,747 B1 | * | 9/2002 | Johnson et al. | 360/132 |
| 6,491,247 B2 | * | 12/2002 | Huettenegger | 242/342 |
| 6,508,427 B2 | * | 1/2003 | Huettenegger et al. | 242/340 |

* cited by examiner

Primary Examiner—Kathy Matecki
Assistant Examiner—Sang Kim
(74) Attorney, Agent, or Firm—Eric D. Levinson (57) ABSTRACT

A drive chuck of a tape drive system for operatively engaging a tape reel of a data storage tape cartridge. The tape reel includes a circular ring of outwardly projecting reel teeth that defines inner and outer circumferential faces. The drive chuck includes a circular ring of drive chuck teeth and an alignment feature. The alignment feature is radially spaced from the drive chuck teeth and includes a radial contact surface. The radial contact surface is configured and positioned to contact one of the inner and outer circumferential faces upon operative engagement between the drive chuck and the tape reel. In one preferred embodiment, the alignment feature is a ring positioned to contact the outer circumferential face of the ring of reel teeth.

23 Claims, 5 Drawing Sheets

TAPE DRIVE SYSTEM WITH RADIAL ALIGNMENT FEATURE

BACKGROUND OF THE INVENTION

The present invention relates generally to a data storage tape drive system. More particularly, it relates to an engagement control feature of a drive chuck component of a tape drive mechanism that improves operative engagement between the data storage tape cartridge and the tape drive mechanism.

Data storage tape drive systems are commonly used in the computer, audio, and video fields to record and store large volumes of information for subsequent retrieval and use. A data storage tape drive system generally includes a data storage tape cartridge selectively engaged with a tape drive mechanism. In this regard, the data storage tape cartridge generally consists of an outer shell or housing maintaining at least one tape reel and a length of magnetic storage tape. The tape reel is rotatably disposed within the housing, and a length of the storage tape is wound about a hub portion thereof The tape drive mechanism generally includes a drive chuck configured to operatively engage and rotate the tape reel, and a drive motor for controlling the drive chuck. The tape drive mechanism also includes transducers, such as a magnetic read/write head, for interacting with and recording data to, or reading data from, the storage tape.

Operative engagement between the data storage tape cartridge and the tape drive mechanism includes engagement of teeth formed on the drive chuck with teeth formed on the tape reel. When mated, these teeth act both to locate the tape reel relative to the drive chuck, and to transmit torque from the tape drive motor/chuck to the tape reel. To this end, one typical tooth design entails sixty teeth on both the tape reel and the drive chuck. As used throughout the specification, the tape reel teeth situated to interact with the tape drive are referred to as "tape reel teeth" or "reel teeth", whereas the corresponding tape drive/chuck teeth are referred to as "drive chuck teeth" or "drive teeth".

Regardless of the number of teeth, upon insertion of the tape cartridge into the drive, the tape reel is generally aligned with the drive chuck. The drive chuck is then maneuvered toward the tape reel (and/or the tape reel is maneuvered toward the drive chuck) such that the drive chuck teeth are guided into mesh engagement with the reel teeth. This meshed relationship facilitates rotation of the tape reel by the drive chuck. At any one point in time, however, only three of the tape reel teeth are in true contact with the drive chuck teeth, as plane of interface can only be defined by three points. Unfortunately, it is virtually impossible with current tape reel designs to predict or dictate which three reel teeth will define the interface plane. As a point of reference, the tape reel components, including the reel teeth, are plastic molded parts. Molding imperfections in the surface of the tape reel teeth, systematic deviations in angular spacing of the teeth due to an off-centered gate location and/or cooling profile, trapped debris, and/or tooth damage due to wear all contribute to defining which three teeth on the tape reel actually contact/engage the drive chuck teeth. Formation of the drive chuck teeth may give rise to similar concerns. Pitch and gear tooth geometry variability due to molding both result in a non-consistent datum reference in the tape reel and drive chuck. This often results in excessive radial and axial run-out that adversely affects reading/recording operations of the tape cartridge. In effect, molding/fabrication imperfections can result in the tape reel rocking or wobbling on the drive chuck during use.

Previously, for several types of tape drive systems, skewing and/or misalignment between the tape reel and the drive chuck did not adversely affect ultimate positioning of the storage tape relative to the read/write head. With a 3480-type (or single reel) tape cartridge, for example, the storage tape is directed a relatively long distance from the housing to the read/write head. Thus, interaction between the read/write head and the storage tape takes place away from the housing and, therefore, away from the tape reel. The relatively ample tape length between the housing and the transducers compensates for skewing and/or misalignment between the tape reel and the drive chuck during operative engagement. Unfortunately, new data storage tape drive systems no longer afford such generous spacing between the housing of a single reel data storage tape cartridge and the transducers of the tape drive mechanism. Further, the continued evolution of storage tape technology toward increasingly smaller track widths amplifies the potential for radial and/or axial misalignment-caused errors. While efforts can be made to more precisely mold/fabricate the tape reel and/or drive chuck teeth, the large increase in cost renders such design efforts economically unviable. Further, some efforts have been made to improve axial alignment or datum plane interaction via additional alignment feature(s) formed on the tape reel as described, for example, in U.S. Pat. No. 6,273,352 to Johnson et al. While most certainly minimizing the opportunity for axial runout, the Johnson et al. configuration does not appear to fully address radial run-out. That is to say, Johnson et al. continues to rely upon the pitch/meshing of the reel teeth and drive chuck teeth to radially locate the tape reel relative to the drive chuck. As previously described, this approach, while well-accepted, cannot eliminate radial run-out concerns.

Accordingly, a need exists for a data storage tape drive system that accurately and consistently controls and aligns, both radially and axially, operative engagement between a tape reel of a data storage tape cartridge and a drive chuck of a tape drive mechanism.

SUMMARY OF THE INVENTION

One aspect of the present invention relates to a drive chuck of a tape drive mechanism for operatively engaging a tape reel of a data storage tape cartridge. In this regard, the tape reel includes a circular ring of outwardly projecting reel teeth that defines inner and outer circumferential faces. With this in mind, the drive chuck includes a circular ring of drive chuck teeth and an alignment feature. The alignment feature is radially spaced from the drive chuck teeth and includes a radial contact surface. In this regard, the radial contact surface is configured and positioned to contact one of the inner and outer circumferential faces upon engagement between the drive chuck and the tape reel. In one preferred embodiment, the alignment feature is a ring positioned to contact the outer circumferential face of the ring of reel teeth.

Another aspect of the present invention relates to a data storage tape drive system including a data storage tape cartridge and a tape drive mechanism. The data storage tape cartridge includes a housing, a tape reel, and a storage tape. The housing defines a tape reel opening. The tape reel is rotatably disposed within the housing at the tape reel opening and includes a circular ring of outwardly projecting reel teeth. In this regard, the ring of reel teeth defines an inner circumferential face and an outer circumferential face. The storage tape is maintained by the tape reel. The tape drive mechanism is adapted to selectively engage the data storage tape cartridge and includes a drive chuck. The drive chuck includes a circular ring of outwardly projecting drive chuck teeth and an alignment feature. The alignment feature is radially spaced from the drive chuck teeth and projects in a direction generally parallel to an axis of rotation. In this regard, the alignment feature is engaged with one of the inner and outer circumferential faces of the ring of reel teeth when the drive chuck is operatively engaged with the tape reel so as to radially align the tape reel relative to the drive chuck.

Yet another aspect of the present invention relates to a method of operatively engaging a drive chuck of a tape drive mechanism with a tape reel of a data storage tape cartridge. In this regard, the drive chuck includes a circular ring of outwardly projecting drive chuck teeth, whereas the tape reel assembly includes a circular ring of outwardly projecting reel teeth that defines an inner circumferential face and an outer circumferential face. The method includes operatively engaging the drive chuck teeth with the reel teeth and contacting one of the inner and outer circumferential faces of the circular ring of drive teeth with an alignment feature of the drive chuck. This contact radially aligns the tape reel relative to the drive chuck.

DETAILED DESCRIPTION OF THE PREFERRED EMBODIMENTS

Figure 1:
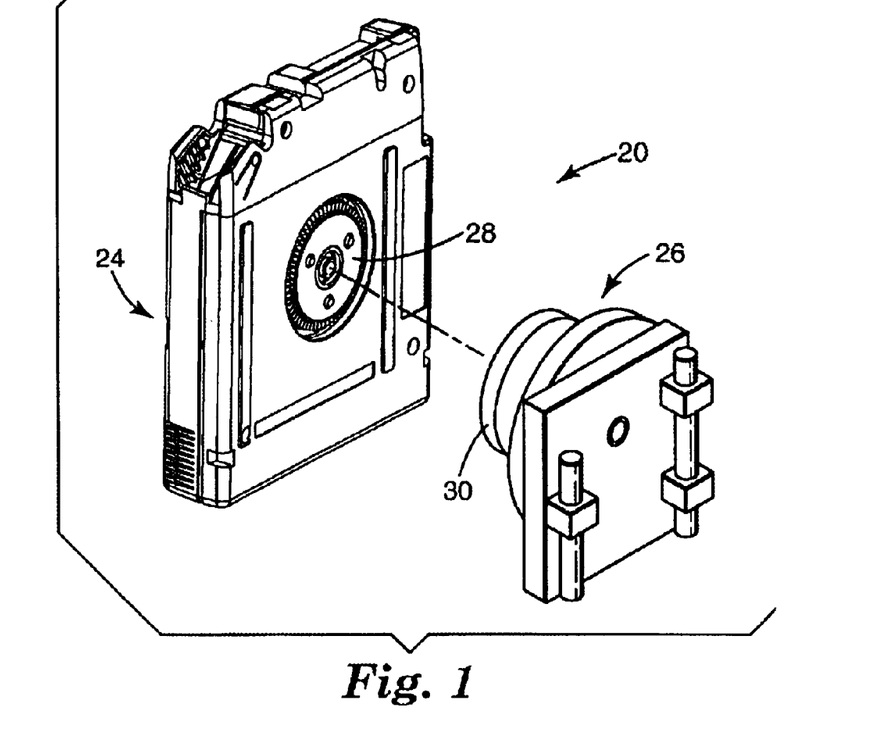
FIG. 1 is an exploded, perspective view of a data storage tape drive system in accordance with the present invention prior to operative engagement.
Figure 2:
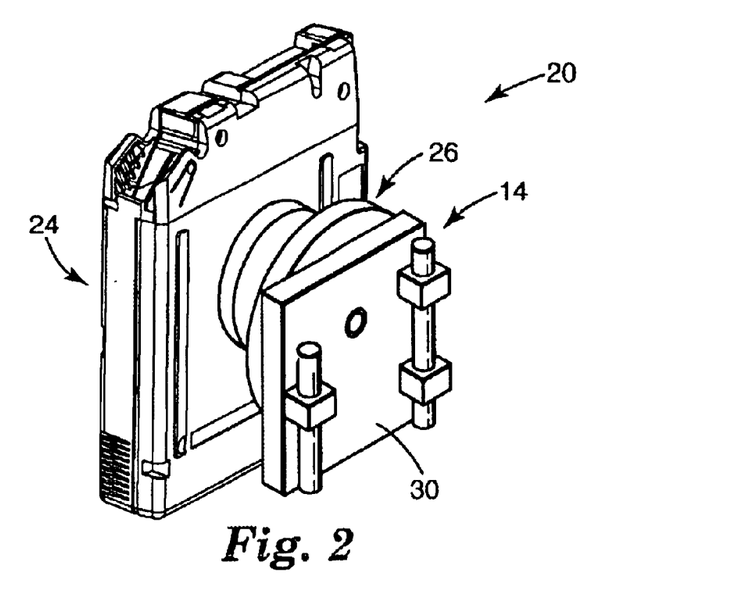
FIG. 2 is a perspective view of the system of FIG. 1 in operative engagement.

As shown in FIGS. 1 and 2, one preferred embodiment of a data storage tape drive system 20 generally includes a tape drive mechanism 22 and a data storage tape cartridge 24. A conventional elevator assembly (not shown) transfers the data storage tape cartridge 24 into contact and operative engagement with the tape drive mechanism 22, as shown in FIG. 2. In this regard, a drive chuck 26 portion of the tape drive mechanism 22 operatively engages a tape reel 28 of the data storage tape cartridge 24. The components are described in greater detail below. In general terms, however, upon operative engagement between the drive chuck 26 and the tape reel 28, the tape reel 28 is aligned relative to the drive chuck 26 by an alignment feature 30 (referenced generally in FIGS. 1 and 2) in accordance with the present invention.

Figure 3:
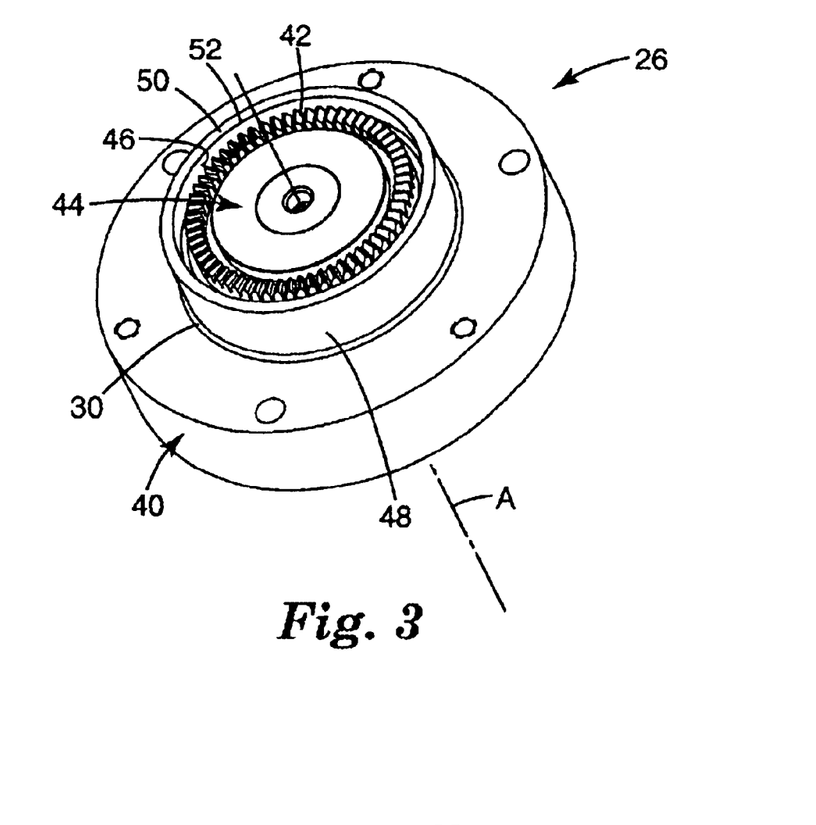
FIG. 3 is a perspective view of a drive chuck portion of a tape drive mechanism in accordance with the present invention.

One preferred embodiment of the drive chuck 26 is shown in FIG. 3. The drive chuck 26 is mounted to a drive motor 40 that, via a controller (not shown), rotates the drive chuck 26 in a desired fashion. With this in mind, the drive chuck 26 includes a ring of drive chuck teeth 42 and the alignment feature 30. The drive chuck teeth 42 and the alignment feature 30 project outwardly in a direction generally parallel to an axis of rotation A of the drive chuck 26. In one preferred embodiment, the drive chuck 26 further includes a magnetic piece 44 used to engage a corresponding portion of the tape reel 28 (FIG. 1). Alternatively, with other, known tape reel configurations, the magnetic piece 44 can be eliminated.

The alignment feature 30 is radially spaced from the drive chuck teeth 42, and is preferably an annular ring. With the one preferred embodiment of FIG. 3, the alignment feature 30 is defined by an inner surface 46, an outer surface 48, and a leading end 50. The leading end 50 defines an axial contact surface, that, as described in greater detail below, dictates an axial position of the tape reel 28 (FIG. 1) relative to the drive chuck 26 upon operative engagement therebetween. With this in mind, the leading end 50 is preferably highly planar, extending perpendicular to the central axis A of the drive chuck 26. Additionally, an edge 52 defined by the inner surface 46 and the leading end 50 serves as a radial contact surface. While the radial contact surface 52 is illustrated as being a distinct or sharp corner, other configurations are equally acceptable. For example, the radial contact surface 52 can be a more elongated surface extending between the inner surface 46 and the leading end 50 at an angle corresponding with a, chamfer defined by an outer surface of teeth of the tape reel 28, as described in greater detail below. Regardless, the radial contact surface 52 dictates radial alignment between the drive chuck 26 and the tape reel 28 upon operative engagement therebetween. In this regard, while the alignment feature 30 has been shown as defining a diameter greater than an outer diameter of the ring of drive teeth 42, the alignment feature 30 can instead be placed within the drive teeth 42. With this alternative construction, the radial contact surface is defined at an intersection or corner edge of the outer surface 48 and the leading end 50.

With the one preferred embodiment of FIG. 3, the alignment feature 30 is formed of a molded plastic. Alternatively, other hardened materials, such as metal (i.e., non-magnetic steel) can be employed. Regardless, the alignment feature 30 is configured to position the radial contact surface 52 at a location that dictates radial positioning of the tape reel 28 (FIG. 1) during use. Further, in a preferred embodiment, an axial length or height of the alignment feature 30 is selected to ensure that the alignment feature 30 dictates tape reel alignment as opposed to the drive chuck teeth 42.

Figure 4:
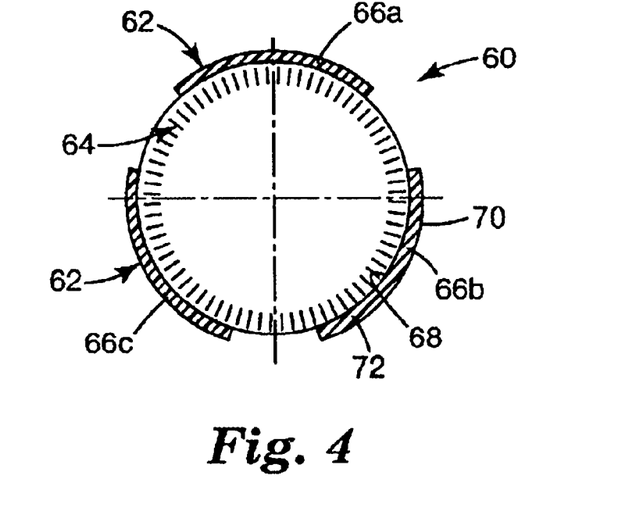
FIG. 4 is a top view of an alternative drive chuck in accordance with the present invention.

While the alignment feature 30 has been preferably described as being an annular ring, other configurations are acceptable. For example, FIG. 4 provides a highly simplified, top view of an alternative embodiment drive chuck 60 including an alignment feature 62. With the embodiment of FIG. 4, the alignment feature 62 is positioned outside of (and radially spaced from) the ring of drive chuck teeth 64 (shown schematically in FIG. 4), and is in the form of a plurality of tabs 66a–66c. More particularly, and in one preferred embodiment, three of the tabs 66a–66c are provided, each being curved or arcuate in shape. Notably, more or less than three of the tabs 66a–66c can be provided, and each of the tabs 66a–66c need not have an identical arc length. Regardless, each of the tabs 66a–66c is defined by an inner surface 68, an outer surface 70, and a leading end 72. Once again, and as described in greater detail below, the leading end 72 preferably serves as an axial contact surface, whereas an intersection between the inner surface 68 and the leading end 72 defines a radial contact surface.

Figure 5:
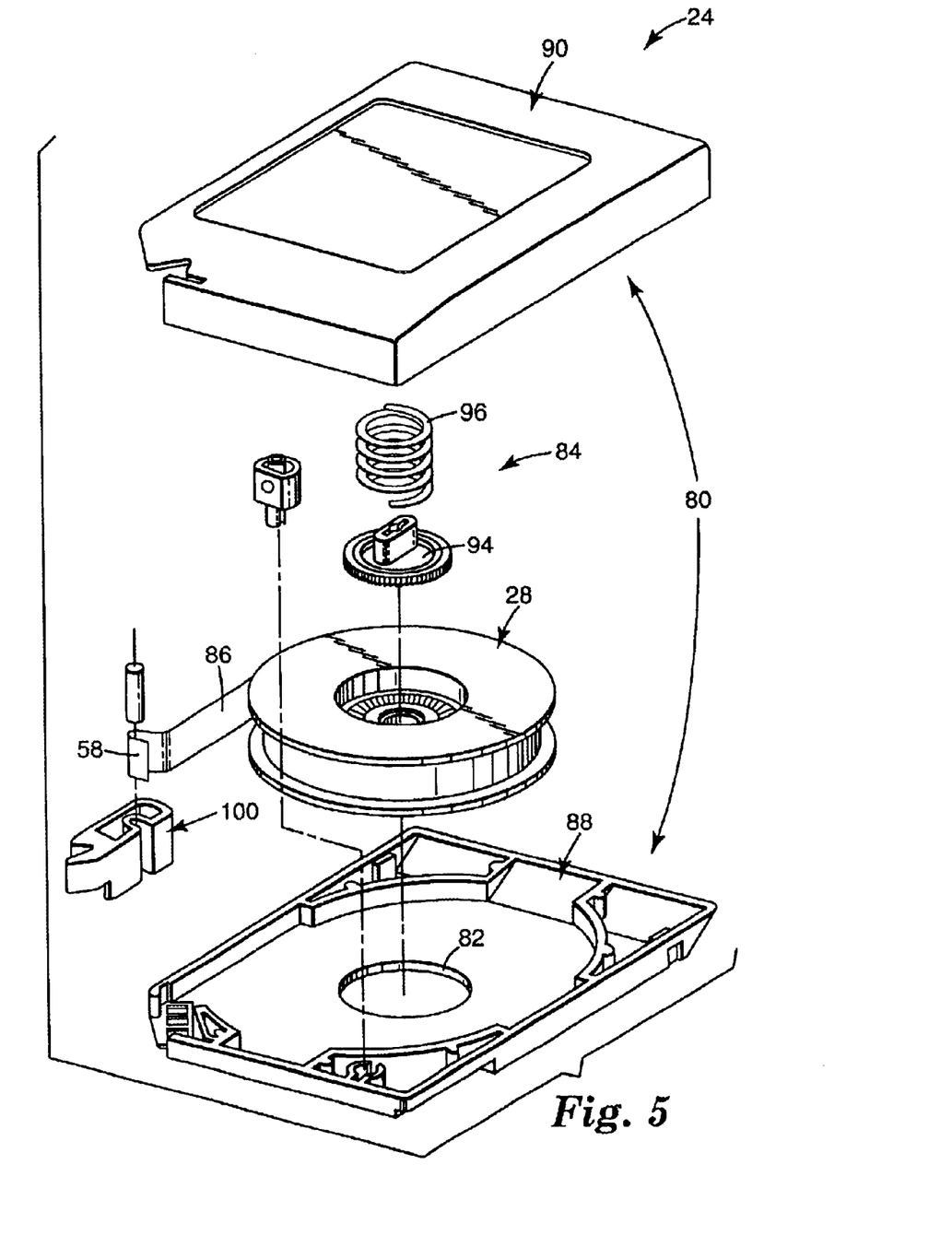
FIG. 5 is an exploded, perspective view of a data storage tape cartridge useful with the system of the present invention.

Regardless of exact form, the drive chuck 26, 60 of the present Invention serves to operatively engage a tape reel component of a data storage tape cartridge, with the alignment feature 30, 62 serving to radially (and preferably axially) locate and align the tape reel relative to the drive chuck 26, 60. With this in mind, FIG. 5 depicts one example of the data storage tape cartridge 24 useful with the present invention. The data storage tape cartridge 24 generally includes a housing 80, the tape reel 28, a brake assembly 84, and a storage tape 86. The housing 80 is formed by a base 88 and a cover 90 each configured to be reciprocally mated to one another. The base 88 defines a tape reel opening 82 that facilitates access to the tape reel 28 and the brake assembly 84 by the tape drive mechanism 22 (FIG. 1). The tape reel 28 is rotatably disposed within the housing 80, and the storage tape 86 is wound around a portion of the tape reel 28.

The brake assembly 84 includes a release button 94 slidably disposed along a connector or tab (not shown) extending from an inner face of the cover 90. Further, a spring 96 biases the release button 94 into selective engagement with a portion of the tape reel 28. In an engaged position, the release button 94 prevents rotation of the tape reel 28. During use, however, the tape drive mechanism 22 (FIG. 1) directs the release button 94 away from the tape reel 28 so as to establish a disengaged position, whereby the tape reel 28 is free to rotate. Alternatively, other configurations for the brake assembly 84, known in the art, are equally acceptable.

The storage tape 86 has a free end 58 that is attached to a leader block 100 by which the storage tape 86 is directed along a tape path within the tape drive mechanism 22 (FIG. 1). Alternatively, other configuration known in the art for the leader block 100 are equally acceptable. For example, the leader block 100 Can be replaced by a dumbbell-shaped pin adapted to be received by an automatic threading apparatus of the tape drive mechanism 22. Even further, depending upon a desired configuration of the data storage tape cartridge 24, the leader block 100 can be eliminated, such as with a dual-tape reel design.

The storage tape 86 is preferably a magnetic tape of a type commonly known in the art. The storage tape 86, for example, can consist of a balanced polyethylene naphthalate (PEN)-based material coated on one side with a layer of magnetic layer dispersed within a suitable binder system, and on the other side with a conductive material dispersed within a suitable binder system.

Acceptable magnetic tape is available, for example, from Imation Corp. of Oakdale, Minn.

As a point of reference, the present invention is useful not only with the example single reel-type data storage tape cartridge 24 shown in FIG. 5, but also with a dual-reel design that is otherwise known in the art. With a dual-reel cartridge, however, two of the drive chucks 26 (FIG. 3) are provided with the tape drive mechanism 22 (FIG. 1).

Figure 6:
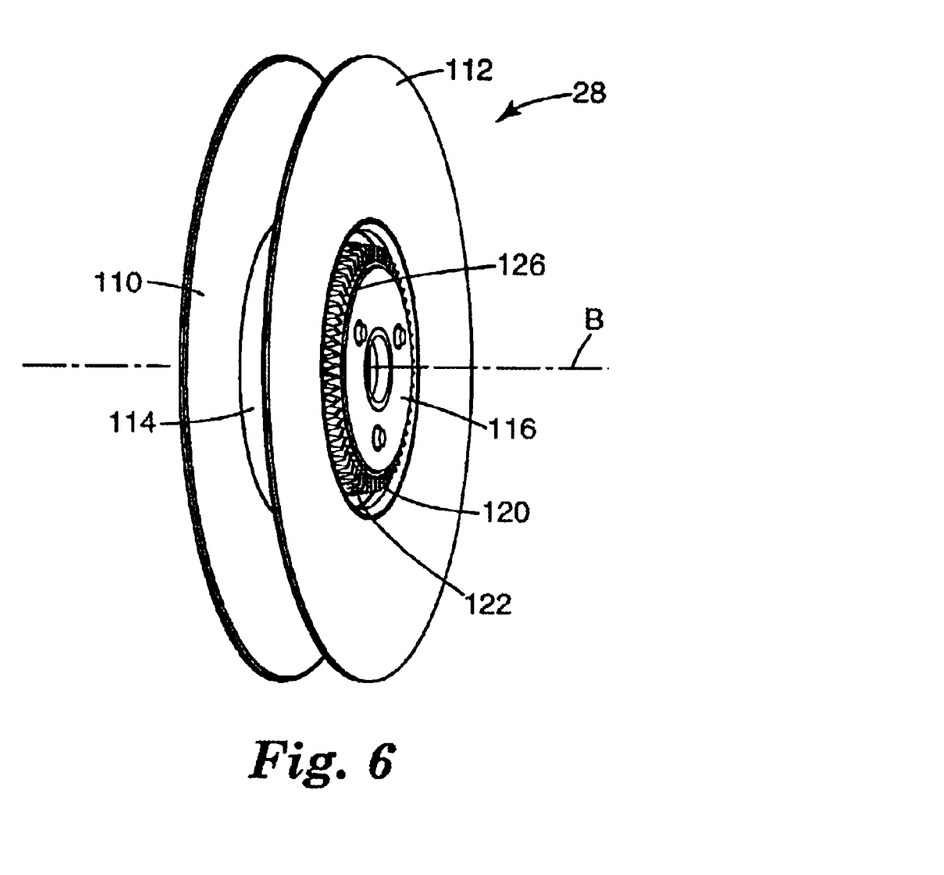
FIG. 6 is a perspective view of a tape reel portion of the cartridge of FIG. 5.

The tape reel 28 is shown in greater detail in FIG. 6 and includes opposing flanges 110, 112, and a hub 114. The upper and lower flanges 110, 112 are secured to, and extend in a radial fashion from, opposite sides of the hub 114, respectively. In one preferred embodiment, the tape reel 28 further includes a metallic insert or a washer 116. As known in the art, the metallic insert 116 is secured to the hub 114 adjacent the lower flange 112, and facilitates magnetically-induced coupling to the tape drive chuck 26 (FIG. 3). Alternatively, the metallic insert 116 can be eliminated with other tape cartridge/tape drive designs.

Figure 7:
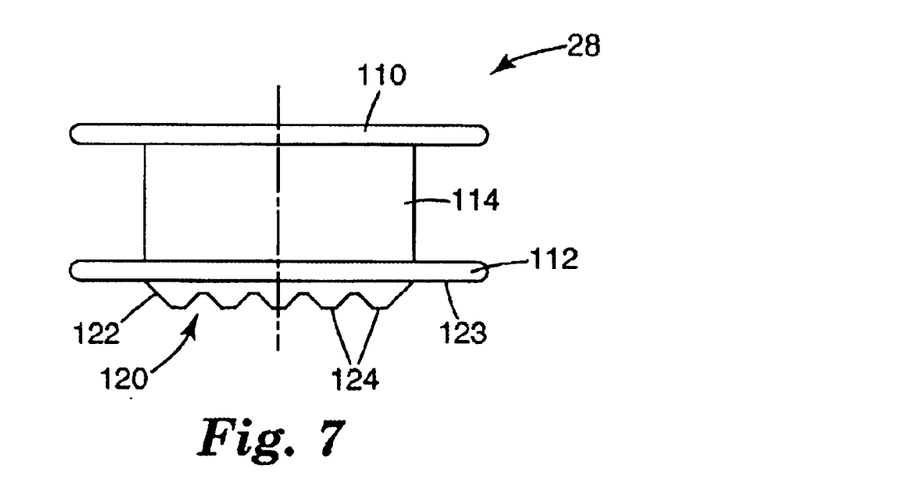
FIG. 7 is a simplified, side view of the tape reel of FIG. 6.

Regardless of the exact construction, the tape reel 28 further includes a circular ring of reel teeth 120 (referenced generally in FIG. 6). With additional reference to FIG. 7, the ring of reel teeth 120 projects from the hub 114 in a direction generally parallel to an axis of rotation B of the tape reel 28. Notably, FIG. 7 is a highly simplified, schematic illustration of the tape reel 28, with the ring of reel teeth 120 being exaggerated in size to better depict projection from the hub 114. With this projection, the ring of reel teeth 120 define an outer circumferential face 122, with each tooth 120 extending from a preferably flat bottom surface 123 and terminating in a tip 124. As best shown in FIG. 7, the outer circumferential face 122 defines a chamfer or angular orientation relative to the axis of rotation B.

Though not viewable in the illustrations of FIGS. 6 and 7, the ring of reel teeth 120 further defines an inner circumferential face (referenced generally at 126 in FIG. 6). This inner circumferential face 126 is not "exposed" with the tape reel 28 design otherwise incorporating the metallic insert 116. However, with alternative tape reel designs (e.g., not including the metallic insert 116), the inner circumferential face 126 will not be encompassed or covered by other components. With this in mind, and again not specifically shown in the various figures, the inner circumferential face 126 may also form a chamfer or angular orientation.

Similar to the data storage tape cartridge 24 (FIG. 5), the tape reel 28 illustrated in FIGS. 6 and 7 and described above is but one example of an available tape reel useful with the present invention. The tape reel 28 can assume a variety of other forms known in the art. To this end, the design of an existing tape reel need not be modified to be used with the present invention. That is to say, so long as the tape reel 28 includes the projecting ring of reel teeth 120, consistent radial alignment with the drive chuck 26 (FIG. 3) can be achieved via the alignment feature 30 (FIG. 3), as described below.

Figure 8:
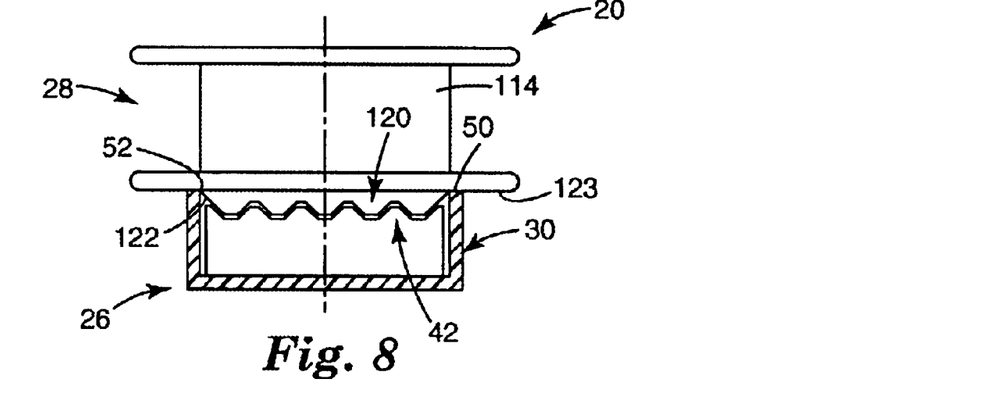
FIG. 8 is a simplified, cross-sectional view showing portions of a tape reel and drive chuck in accordance with the present invention in operative engagement.
Figure 9:
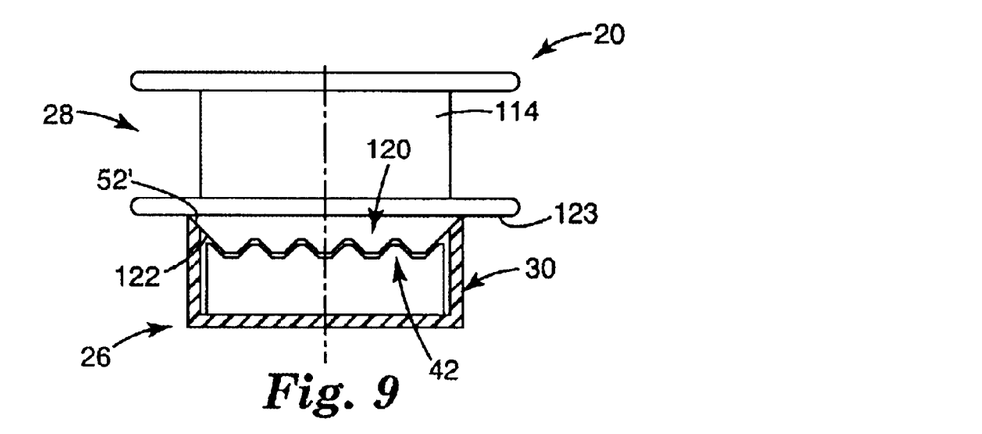
FIG. 9 is a simplified, cross-sectional view showing portions of a tape reel and an alternative embodiment drive chuck in accordance with the present invention in operative engagement.

With the above description of the tape reel 28 in mind, and returning to FIGS. 1 and 2, operation of the data storage tape drive system 20 in accordance with the present invention entails (after loading of the data storage tape cartridge 24) directing the tape reel 28 toward the drive chuck 26 and/or the drive chuck 26 toward the tape reel 28. As the drive chuck 26/tape reel 28 become operatively engaged, the alignment feature 30 locates and aligns the tape reel 28, and in particular the tape reel teeth 120 (FIG. 6), relative to the drive chuck 26, and in particular the drive chuck teeth 42 (FIG. 3). For example, as shown by the simplified illustration of FIG. 8, the radial contact surface 52 contacts or engages the outer circumferential face 122 of the reel teeth 120. This interface radially aligns the tape reel 28 relative to the drive chuck 26. Thus, with respect to the configuration of FIG. 8, an inside diameter defined by the radial contact surface 52 corresponds with an outer diameter defined around the outer circumferential face 122 of the reel teeth 120. With the one preferred embodiment of FIG. 8, the radial contact surface 52 contacts the outer circumferential face 122 at the point of intersection of the outer circumferential face 122 with the bottom surface 123 of the hub 114. Alternatively, the alignment feature 30 can be configured to locate the radial contact surface 52 at any point along the outer circumferential face 122 (i.e., space from the bottom surface 123). Further, with reference to FIG. 9 and as previously described, the radial contact surface 52' in FIG. 9 can be an elongated surface extending an angle that matches a chamfer of the outer circumferential face 122 of the reel teeth 120.

As previously described, the tape reel 28 can be configured such that the inner circumferential face 126 (generally referenced in FIG. 6) of the reel teeth 120 is "exposed". With this design, the alignment feature 30 can be configured such that the radial contact surface is defined at the outer surface 48/leading end 50 (FIG. 3), and positioned to contact the inner circumferential face 126. Regardless, the alignment feature 30 effectuates radial alignment apart from the drive chuck teeth 42. In other words, unlike previous designs, drive chuck 26/tape reel 28 radial alignment is not dependent upon interaction between the drive teeth 42 and the reel teeth 120.

In a preferred embodiment, the alignment feature 30 further facilitates axial alignment between the drive chuck 26 and the tape reel 28. In particular, the leading end 50 contacts the bottom surface 123 of the hub 114 along a plane that is otherwise perpendicular to the axis of rotation of the tape reel 28 and the drive chuck 26. With this preferred location approach, unexpected variations or tolerance deviations in the drive teeth 42 and/or the reel teeth 120 will not negatively affect desired axial or planar positioning of the tape reel 28 relative to the drive chuck 26. More preferably, the alignment 30 feature is configured to dictate that a small axial gap exists between the tape reel teeth 120 and the drive chuck teeth 42 upon final engagement. The teeth 42/120 mesh with one another such that rotation of the drive chuck 26 is imparted to the tape reel 28. However, the small gap ensures that the alignment feature 30 dictates radial and axial alignment between the drive chuck 26 and the tape reel 28.

Figure 10:
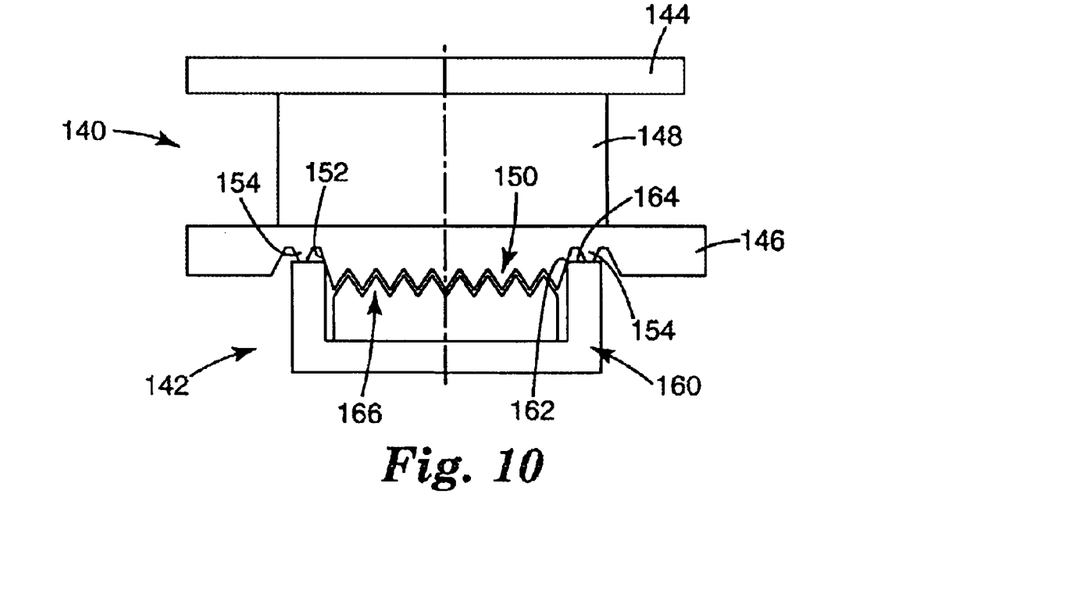
FIG. 10 is a simplified, cross-sectional view of the drive chuck of the present invention operatively engaged with an alternative tape reel.

As previously described, the tape reel 28 can assume a variety of forms other than that specifically illustrated in the various figures. For example, a known alternative tape reel configuration employs one or more projecting tabs or pads that serve to facilitate axial alignment between the tape reel and drive chuck. Examples of such a tape reel configuration are provided in U.S. Pat. No. 6,273,352, the teachings of which are incorporated herein by reference. As shown in FIG. 10, the alignment feature of the present invention can be adapted to conform with the design constraints of such a tape reel configuration. In particular, FIG. 10 illustrates, in highly simplified form, a tape reel 140 and a drive chuck 142. The tape reel 140 includes opposing flanges 144, 146 and a hub 148. A circular ring of reel teeth 150 extends outwardly from the hub 148. In this regard, the ring of reel teeth 150 defines an outer circumferential face 152. Further, the tape reel 140 includes datum pads 154 projecting from the hub 148 and radially spaced from the ring of reel teeth 150.

The drive chuck 142 of FIG. 10 includes an alignment feature 160 defining a radial contact surface 162 and an axial contact surface 164. The radial contact surface 162 radially spaced from a ring of drive chuck teeth 166 and is configured and positioned to contact the outer circumferential face 152 of the ring of reel teeth 150, thereby effectuating radial alignment between the tape reel 140 and the drive chuck 142. The axial contact surface 164, on the other hand, contacts the datum pads 154 to establish axial alignment of positioning. Once again, while the radial contact surface 162 is illustrated as a corner, a more elongated surface is equally acceptable, similar to that shown, for example, in FIG. 9.

The data storage tape drive system of the present invention, and in particular the alignment feature associated with the drive chuck, provides enhanced positioning accuracy and reduced axial and radial run-out of the tape reel relative to the drive chuck. This, in turn, dramatically improves functioning of the data storage tape drive system. For example, the present invention reduces or eliminates low frequency speed variations of the storage tape otherwise related to radial run-out. The opportunity for tape reel hub flange interference with the storage tape (or "flange hits") otherwise caused by axial run-out is reduced or eliminated. Similarly, transverse storage tape motion caused by axial and radial run-out is greatly reduced or eliminated. Finally, an overall stability of the tape pack (i.e., storage tape wrapped about the tape reel hub) is achieved, resulting in less edge damage to the storage tape. By shifting the locating function from the tape reel teeth pitch to the outer or inner circumferential face thereof, economies of production can be gained. Whereas in the past, the locational precision of the tape reel and the drive chuck were dependent upon the molding and fabricating precision of the complex tape reel teeth, this precision is no longer required by the present invention. Instead, the alignment feature positions the tape reel using simple, easily controlled features rather than the theoretical pitch diameter of the tape reel teeth. In effect, the alignment feature becomes the primary locator, and the tape reel teeth are the means by which the tape reel is rotated by operative engagement with mating drive chuck teeth. The tape reel teeth no longer act as locators for positioning the hub. Thus, a less-exacting manufacturing process can be used in forming the tape reel, thereby reducing overall costs while achieving improved operational performance.

Although the present invention has been described with reference to preferred embodiments, workers skilled in the art will recognize that changes can be made in form and detail without departing from the spirit and scope of the present invention.

What is claimed is:

1. A drive chuck of a tape drive mechanism for operatively engaging a tape reel of data storage tape cartridge, the tape reel including a circular ring of outwardly projecting reel teeth defining inner and outer circumferential faces, the drive chuck comprising:

a circular ring of outwardly projecting drive chuck teeth and an alignment feature radially spaced outside the drive chuck teeth, the alignment feature including a radial contact surface configured and positioned to contact one of the faces of the ring of reel teeth upon operative engagement between the drive chuck and the tape reel.

2. The drive chuck of claim 1, wherein the alignment feature is a ring.

3. The drive chuck of claim 1, wherein the alignment feature includes a plurality of spaced tabs combining to define a circumference.

4. The drive chuck of claim 3, wherein each of the tabs are elongated, arcuate-shaped bodies.

5. The drive chuck of claim 1, wherein the radial contact surface is configured and positioned to contact one of the inner and outer faces at at least three locations.

6. The drive chuck of claim 1, wherein the alignment feature further includes an axial contact surface configured and positioned to contact a portion of the tape reel apart from the reel teeth.

7. The drive chuck of claim 1, wherein the radial contact surface is a corner.

8. The drive chuck of claim 1, wherein the radial contact surface is an elongated surface.

9. A data storage tape drive system comprising:
   a data storage tape cartridge including:
      a housing defining a tape reel opening,
      a tape reel rotatably disposed within the housing at the tape reel opening, the tape reel including a circular ring of outwardly projecting reel teeth defining inner and outer circumferential face,
      a storage tape maintained by the tape reel; and
   a tape drive mechanism selectively engaged with the data storage tape cartridge, the tape drive mechanism including:
      a drive chuck including a circular ring of outwardly projecting drive chuck teeth and an alignment feature radially spaced from the drive chuck teeth, the alignment feature including a radial contact surface;
   wherein the alignment feature is engaged with one of the inner and outer faces of the ring of reel teeth when the drive chuck is operatively engaged with the tape reel to radially align the tape reel relative to the drive chuck and maintains an axial gap between the reel teeth and the drive chuck teeth.

10. The data storage tape drive system of claim 9, wherein the alignment feature is positioned outside of the drive chuck teeth such that upon operative engagement between the drive chuck and the tape reel, the alignment feature engages the outer face of the ring of reel teeth.

11. The data storage tape drive system of claim 9, wherein the alignment feature is a ring.

12. The data storage tape drive system of claim 9, wherein the alignment feature includes a plurality of spaced tabs combining to define a circumference.

13. The data storage tape drive system of claim 12, wherein each of the tabs are elongated, arcuate-shaped bodies.

14. The data storage tape drive system of claim 9, wherein the radial contact surface is configured and positioned to contact one of the inner and outer faces at at least three locations.

15. The data storage tape drive system of claim 9, wherein the alignment feature includes the radial contact surface for engaging one of the inner and outer faces of the ring of reel teeth and an axial contact surface that contacts a portion of the tape reel apart from the reel teeth to establish an axial position of the tape reel relative to the drive chuck upon operative engagement between the drive chuck on the tape reel.

16. The data storage tape drive system of claim 15, wherein the reel teeth extend from a planar base, the axial contact surface contacting the planar base upon operative engagement between the drive chuck on the tape reel.

17. The data storage tape drive system of claim 9, wherein the radial contact surface is a corner.

18. The data storage tape drive system of claim 9, wherein the radial contact surface is an elongated surface.

19. The data storage tape drive system of claim 18, wherein the radial contact surface extends at an angle corresponding with a chamfer of the outer circumferential face of the reel teeth.

20. A method of operatively engaging a drive chuck of a tape drive mechanism with a tape reel of a data storage tape cartridge, the drive chuck including a circular ring of outwardly projecting drive chuck teeth and the tape reel including a circular ring of outwardly projecting reel teeth defining an inner circumferential face and an outer circumferential face, the method comprising:
   operatively engaging the drive chuck teeth with the reel teeth;
   maintaining an axial gap between the reel teeth and the drive chuck teeth; and
   contacting one of the inner and outer circumferential faces of the circular ring of reel teeth with an alignment feature of the drive chuck to radially align the tape reel relative to the drive chuck.

21. The method of claim 20, wherein contact between the alignment feature and the ring of reel teeth is apart from contact between the reel teeth and the drive teeth.

22. The method of claim 20, wherein the alignment feature contacts the outer circumferential face of the ring of reel teeth.

23. The method of claim 20, wherein the alignment feature contacts the ring of reel teeth at three circumferentially spaced locations.

* * * * *